Jan. 17, 1967  C. E. KRUEGER  3,298,271
FASTENER HAVING LAYER OF FOAMED RESIN WITH
INDEXING MEANS PROJECTING THERETHROUGH
Filed Nov. 12, 1964
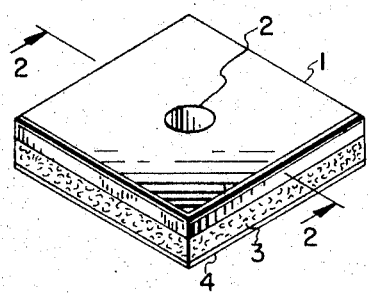
FIG. 1
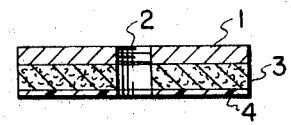
FIG. 2
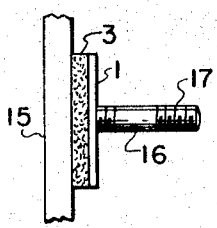
FIG. 3
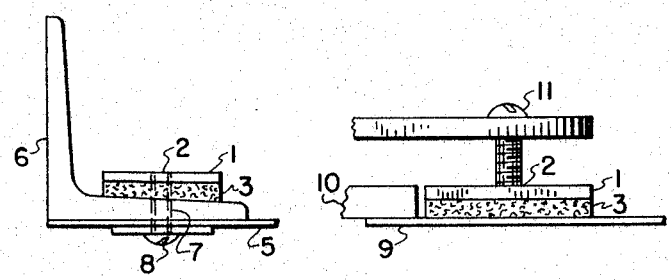
FIG. 4
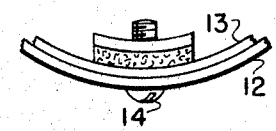
FIG. 5
FIG. 6
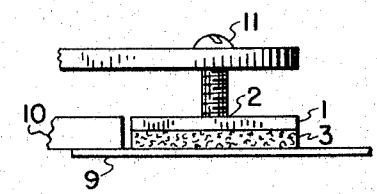
FIG. 7
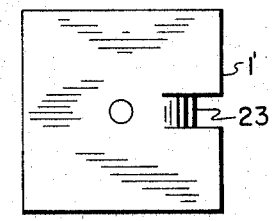
FIG. 8
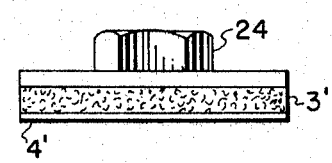
FIG. 9
INVENTOR.
CARL E. KRUEGER
BY Ralph G. Hohenfeldt
ATTORNEY

3,298,271
FASTENER HAVING LAYER OF FOAMED RESIN WITH INDEXING MEANS PROJECTING THERETHROUGH

Carl E. Krueger, Delafield, Wis., assignor to General Electric Company, a corporation of New York
Filed Nov. 12, 1964, Ser. No. 410,599
1 Claim. (Cl. 85—32)

This invention relates generally to fasteners and especially to fasteners for joining metal sheets, fragile panels, and the like with each other or with more rigid members.

In industry there are many occasions for joining thin metal and non-metal sheets together rapidly and securely. Among the common ways of doing this is to drill an undersized hole and then insert a self-tapping screw. Another method is to drill a clearance hole and insert a standard screw to which a washer and a nut may be applied if the screw end is accessible. There are also many special fasteners for securing thin sheets.

One of the problems with known types of fasteners is that they do not provide sufficient bearing area or reenforcement in the vicinity of the fastening. This results in the thin sheets tearing near the fastening when the sheet is subject to stress. Another problem is that accessibility to the place where the fastener is to be applied is often lost when a sheet is fabricated in an enclosed structure. This may compel resorting to fastening methods that are less than optimum.

Objects of the present invention are to overcome the above noted and other problems by providing a fastener that may be located at the point of use before fabrication of the parts; that will stay in place during repeated assembly and disassembly; that will strengthen and prevent tearing of the thin sheets in the vicinity of the fastener; that is inexpensive and easy to manufacture in large quantities; and, that will be applicable in cases where a wide variety of different kinds of fasteners are now being used.

A more specific object is to provide fasteners that comprise a member that may have a threaded hole or a hole for receiving a self-tapping screw. A conformable nonmetallic sheet material is adhered on at least one face of the member with a pressure sensitive adhesive, preferably, between the interface of the member and the sheet. The opposite face of the sheet is covered with a backing film which when removed exposes a pressure sensitive adhesive that will hold the fastener in any desired location at which it is pressed on an article.

Achievement of the foregoing and other objects will be evident from time to time throughout the course of the following specification which will describe several embodiments of the invention in conjunction with the drawing in which:

FIGURE 1 is an isometric view of one form of fastener made in accordance with the invention;

FIGURE 2 is a section taken on the line corresponding approximately with 2—2 in FIGURE 1;

FIGURES 3-6 show, in said elevation, uses of the new fastener in various structures;

FIGURE 7 illustrates in cross-section a modified version of the new fastener and parts fastened thereby;

FIGURE 8 is a top view of the fastener shown in FIGURE 7; and,

FIGURE 9 is another modification of the fastener.

Attention is now invited to FIGURES 1 and 2 in relation to which the features of the new fastener will be described. The fastener comprises a plate-like member 1 which is preferably of metal. In the center of member 1 is a hole 2 that extends through the former. In some instances, hole 2 may have an internal thread and in other instances it may be unthreaded to admit a self-tapping screw. Adhered to member 1 is a layer 3 of resilient or conformable material. At the interface of member 1 and layer 3 there is an adhesive that will hold them together. On the bottom face of conformable layer 3 is a backing sheet 4 which may be peeled off when the fastener is to be applied to the surface of an object which is to be joined with another. At the interface of conformable layer 3 and backing sheet 4 is a pressure sensitive adhesive which is retained on layer 3 and exposed by removal of backing sheet 4.

Conformable layer 3 may be made of materials such as synthetic or natural rubber and the various foamed resins. A preferred material is open cell polyurethane foam of the ester type having a density of ten to twenty pounds per cubic foot. A suitable adhesive coated foam of this type is obtainable from Minnesota Mining and Manufacturing Company under its numbers 4008, 4016, 4032, and Y-9122. This foam may be procured in rolls in the form of tape or in sheets. Each face has pressure sensitive adhesive on it. Both faces of the foam may be covered with a liner backing strip but in the roll form only one face needs to be covered because the single strip intervenes between layers and serves the purpose of two. The foam tape may be unrolled and applied to a large metal sheet while the backing liner that is designated 14 in FIGURE 1 remains in place. The one exposed adhesive coated face will, of course, adhere to the metal sheet when pressure is applied. The whole sheet is then cut into strips and subsequently into squares to form the sandwich-like fastener depicted in FIGURE 1.

The backing layer 4 may comprise a paper that is appropriately treated so as to prevent removal of the adhesive from the face of the foam layer 3 and to peel freely from the adhesive on the foam. Silicone and polyethylene treated papers serve this purpose well.

Any compatible pressure sensitive adhesive may be applied to opposite faces of the foam 3 at its interfaces with plate member 1 and backing liner 4. An acrylic type synthetic, long aging, high tack adhesive serves this purpose well.

These fasteners have been made with conformable layers 3 that range in thickness between 1/32 inch and 1/4 inch. Better conformity to highly irregular surfaces is obtained when layer 3 is thicker. In addition, the thicker layers are more effective in absorbing vibration and accompanying noise when the fasteners are used in sheet metal fabrication.

One use of the new fastener is illustrated in FIGURE 3. In this case the object is to fasten a thin sheet 5 to an angle member 6 and it may be assumed that the inside or back of the angle is inaccessible. In such a case, a hole 7 may be drilled or punched in angle 6 and the fastener applied to the back thereof. This is done by applying the exposed face of foam layer 3 to the back surface of the angle iron to which it will adhere if pressed just slightly. Location is such as to effect registry between hole 2 in the fastener and hole 7 in the angle member. When the fastener is in place, the sheet 5 may be attached by using as many screws 8 as are necessary to support the sheet. Of course, hole 2 in the fastener may be tapped or self-tapping depending upon the kind of screw 8 which one desires to use.

FIGURE 4 illustrates another application of the fastener to a construction where it is desired that no fastening means show on the bottom face of a sheet 9 of plastic or metal which one desires to hold in place against a shoulder 10. In this application, the fastener may be applied directly to sheet 9 without a through-hole. The fastener itself, then provides a tapped hole 2 which may be entered by a screw 11 to bring about the desired support for sheet 9.

As seen in FIGURE 5, the fastener may be curved as well as flat. The curved form is most desirable when one wants to couple interfitting tubular thin sections such as 12 and 13. In this use, as before, the backing liner is removed and the fastener is pressed onto the internal surface of sheet metal tube 13, for instance, and a screw 14 inserted to join the members together.

Another use of the fastener is illustrated in FIGURE 6 where it is seen to be adhered to an upright member 15, such as a wall. In this case, there is a stud 16 threaded into plate member 1 and the outwardly extending end of the stud is provided with a thread 17 to enable handling any item that one desires on the stud or a plurality of them. This application is ideal for supporting flat objects such as mirrors on a wall.

Use of a slightly modified version of the fastener is shown in FIGURE 7. In this case it is desired to fasten a decorative panel sheet of plastic 18 to a blind or inaccessible support 19. This use is typified in connection with fixing plastic upholstery panels 18 on the interior of automobiles where the support member 19 is inaccessible. In such a case, the support member is provided with an elongate hole 20 through which a chrome-plated oval head screw 21 passes freely. The head of screw 21 may nest in a decorative convex washer 22 for the sake of appearance. In the course of assembly, the foam layer 3' is pressed against member 19 to which it adheres after the backing layer 4 is removed therefrom. To assure that thread hole 2' will register essentially centrally with elongated hole 20 there is provided on plate member 1' a turned-down stake 23 which, as can be seen in FIGURE 8, is merely pierced downwardly at the edge of plate member 1. Misalignment is avoided by urging the stake 23 against the right hand edge of slotted hole 20 in which case drilled hole 2' will always be in the center.

The principles of the fasteners described above may also be applied to more conventional fastening devices such as the flanged nut 24 shown in FIGURE 9. On some occasions, it may be desired to use a nut of this kind where it would be desirable for the nut to be retained in place while something else is being fastened to it. To achieve this it is only necessary to surface the nut with a conformable layer 3' which is covered by a backing layer 4'. The nuts may be stored in this condition and the backing layer removed prior to setting the nut in place by pressing it against another object as described above. An unobvious quality of some of the versions of the above described fastener is that they can be made to act like a self-locking nut and thereby resist loosening when subjected to vibration. This may be done by omitting the perforation from the foam layer where it aligns with tapped hole 2 in the plate member. With this design, when in FIGURE 3 for example, a screw 8 is forced through the foam, some of the latter is pushed into the screw hole to effect greater friction and tightening of the screw in the hole. Another advantage over the well-known spring metal nuts is that upon tightening the screw thread in the new fastener, the thread is less apt to shear off or strip because of the greater, but not exceedingly great, thickness of the plate member 1. Another advantage of the new fastener as compared with spring metal nuts is that the new fastener resides entirely on one side of the members to be fastened without any projection to the other side of the purpose of anchoring the same. Thus, one panel sheet may be imposed directly on the other without anything between them that would tend to create a gap or otherwise cause the faces of the sheets to be uneven. In addition, the new fastener may be removed when desired by cutting through the conformable layer edgewise with a razor blade or the like.

In summary, it is seen that the new fasteners have the advantages of low cost, reduced vibration transmission, conformability to slightly irregular surfaces, being suitable for use with thin sheets that cannot be tapped, not falling off during assembly or disassembly and of being removable when necessary. The new fasteners are easy to use. It is only necessary to remove the protective liner and press them in place. They may be installed at the factory in an assembly with the backing liner in place and then used to complete fabrication in the field at a considerably later time.

Although several forms of the new self-adhering fastener have been described, such description is to be considered illustrative rather than limiting, for the invention may be variously embodied and is to be limited in scope only by interpretation of the claim which follows.

It is claimed:

A fastener comprising:
(a) a rigid member having a pair of flat parallel faces with a hole extending therethrough adapted to threadedly receive an externally threaded element,
(b) a conformable layer formed of open cell foamed resin having two parallel faces, one of which is adhered at its interface in juxtaposed relationship with the rigid member,
(c) an adhesive coating on the face of the conformable layer that is remote from the interface with a thin backing liner adhered to but separable from said remote face, and
(d) a protuberance extending integrally from the rigid member at a point radially outwardly of said hole and extending at substantially a right angle to said rigid member through the conformable layer, said protuberance projecting from said remote face thereof to define an indexing means to be received in a slotted opening in a work piece to assume proper alignment of the fastener and the work piece.

References Cited by the Examiner

UNITED STATES PATENTS

| | | | |
|---|---|---|---|
| 2,150,194 | 3/1939 | Thomas | 151—7 |
| 2,697,873 | 12/1954 | Cooke. | |
| 2,943,661 | 7/1960 | Stern | 85—32 |

FOREIGN PATENTS 405,203  2/1934  Great Britain.

OTHER REFERENCES

Morgan, Phillip: Plastic Progress 1955, Philosophical Library, New York, 1956 (pp. 81–92 relied on).

CARL W. TOMLIN, *Primary Examiner.*

R. S. BRITTS, *Assistant Examiner.*